United States Patent [19]
Deutscher et al.

[11] 3,727,262
[45] Apr. 17, 1973

[54] WINDSHIELD WIPER ASSEMBLY FOR HEADLAMP

[75] Inventors: Hans-Christian Deutscher, Ludwigsburg; Kurt Bauer, Kleiningersheim, both of Germany

[73] Assignee: SWF-Spezialfabrik fur Autoyubehor Gustav Rau, GmbH, Bietigham, Germany

[22] Filed: Sept. 14, 1971

[21] Appl. No.: 180,362

[30] Foreign Application Priority Data

Dec. 3, 1970   Germany..................P 20 59 525.9

[52] U.S. Cl..............................15/250.23, 15/250.27
[51] Int. Cl................................................B60s 1/32
[58] Field of Search................15/250.14, 250.21, 15/250.23, 250.27, 250.3, 250.35

[56] References Cited

UNITED STATES PATENTS

| | | | |
|---|---|---|---|
| 2,800,676 | 7/1957 | Makela et al. | 15/250.23 |
| 2,811,736 | 11/1957 | Kurkechian | 15/250.23 |
| 2,834,038 | 5/1958 | Kramer | 15/250.23 |
| 3,487,493 | 1/1970 | Schmid et al. | 15/250.23 |
| 3,551,938 | 1/1971 | Yonke | 15/250.23 |

FOREIGN PATENTS OR APPLICATIONS

| | | | |
|---|---|---|---|
| 848,577 | 9/1960 | Great Britain | 15/250.42 |

*Primary Examiner*—Peter Feldman
*Attorney*—John J. McGlew et al.

[57] ABSTRACT

A windshield wiper assembly for use in association with a rectangular headlamp includes, a first wiper arm and a second wiper arm shorter than the first pivotally mounted for oscillation about the same pivotal mounting. The arms are connected at their respective outer ends to respective yokes or stirrups which engage the wiper blade. The individual yokes engage the blade at longitudinally spaced locations and the individual wiper blade arms which carry the yokes are connected to an operating mechanism which moves them through different angles of oscillation. The longer arm moves through a smaller angle of oscillation than the shorter arm so that the stirrups which engage and move the blade can move substantially parallel from one side of the headlight to the other.

8 Claims, 3 Drawing Figures

WINDSHIELD WIPER ASSEMBLY FOR HEADLAMP

BACKGROUND OF THE INVENTION

1. Field of the Invention

This invention relates in general to the construction of windshield wipers and, in particular, to a new and useful windshield wiper particularly for use in association with the wiping of a rectangular headlight and which includes separate oscillatable supporting arms which support individual stirrups carrying the wiper blade and which move through distinct angles.

2. Description of the Prior Art

The invention relates particularly to a wiper installation which is usable with a rectangular headlamp glass of a vehicle, more especially an automobile. It is difficult to provide a wiper installation for rectangular headlamp glasses, in which substantially the whole light surface is swept by the wiper blade and in which, in the parking position of the wiper blade, the light emitted by the headlamp is only partially blocked by the wiper blade elements. In the known windshield wiper construction, the wiper blade is supported by the wiper arm which is oscillated so that the blade sweeps over an arcuate path so that a segment of a circular wiper area is effected. An additional guide arm has bee employed in order to obtain a substantially rectangular wiping area of movement of the blade. With such a wiping installation, the guide arm is carried along with the blade and therefore participates only passably in the control of the wiper blade. As a result, the shape of the wiping area is definitely limited. With a small headlamp, a short wiper arm will not be sufficient to produce a rectangular wiping area, particularly when the headlamp glasses are more highly curved toward the side of the vehicle.

SUMMARY OF THE INVENTION

The present invention provides a windshield wiping installation for substantially rectangular headlamp glasses in which the whole glass area is wiped by the action of the wiper blade and wherein, in the parking position, the wiper blocks only a negligible portion of the glass. During the wiping action, the wiper blade is guided by two wiper arms which are connected at spaced longitudinal locations to the blade so that it is guided over its whole length as the headlamp glasses wipe.

In the preferred arrangement, the construction includes a long wiper arm and a shorter length wiper arm which are mounted for oscillatory movement about the same pivotal connection. The wiper arms are oscillated through different angles and, in the parking position, the shorter one underlies the longer one. The pivot for the wiper arms is located outside of the glass wiping area. Each wiper arm carries at least one supporting yoke with engagement claws at each end which engage over the blade at respective spaced longitudinal locations. The yokes are pivoted to the associated wiper blade arm on pivots extending at right angles to the wiping area. The yokes engage a single wiper blade of a length equal to the width of the headlamp glass and the blade is resilient at right angles to the wiping area. By means of such a wiper construction, a substantially rectangular headlamp glass is swept over and cleaned completely even if there are partial areas of different curvatures. The two wiper arms may assume a parking position in which the wiping strip is supported on the frame of the headlamp glass. The part of the headlamp glass so covered is of relatively small dimensions.

Accordingly, it is an object of the invention to provide an improved wiper arm construction which includes a plurality of wiper arms of different lengths, with the shorter ones underlying the longer ones in a park position and each being pivotally mounted for oscillation about a common pivot point located outside of the wiping area, each blade carrying a yoke which is engageable with the same wiper blade at spaced longitudinal locations, the yoke being pivotal about a pivot axis extending normal to the wiping area, and means for oscillating the individual blades through separate angles of oscillation in order to move the individual arms so as to move the wiper blades substantially without angular change of position as it cleans the wiping area.

A further object of the invention is to provide a windshield wiper construction which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
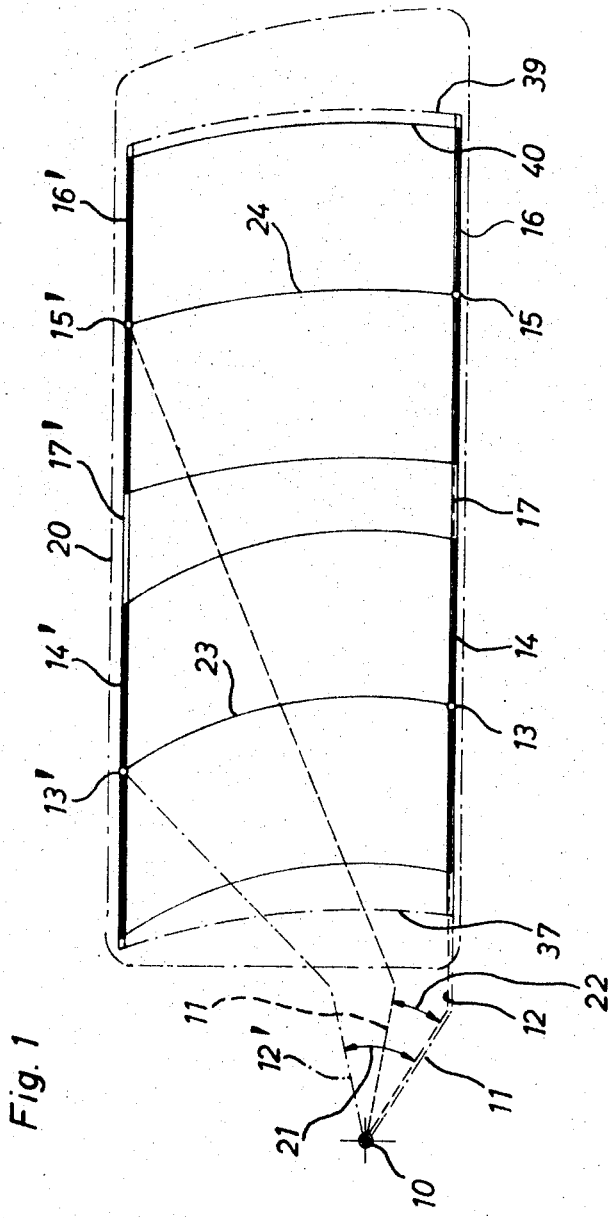
FIG. 1 is a schematic plan view of a guidance system for a wiper blade for a rectangular glass of a headlight constructed in accordance with the invention.

Referring to the drawings in particular, the invention embodied therein, comprises two wiper arms, a first or long wiper arm 11, and a second or shorter wiper arm 12, which are mounted for oscillation about a common pivot 10 defined by an axial pivot member 25 but which are separately driven. In the parking position, the longer wiper arm 11 is located so as to overlie the shorter wiper arm 12 along the lower edge of the rectangular headlamp 20.

In accordance with the invention, each wiper arm carries a separate yoke or stirrup, the long arm 11 having a yoke 16 which is pivoted on a pivot bearing 15 of the wiper arm 11, and a shorter wiper arm 12 having a yoke 14 which is pivoted on a pivot bearing 13 on the wiper arm 12. The yokes 14 and 16 are joined at longitudinally spaced locations to a common strip or blade 17 which is resilient at right angles to the wiping area, that is, relative to the plane of the glass 20.

Oscillating movements of different angles 22 and 21 are imparted to the respective long wiper arm blade 11 and short wiper arm blade 12, respectively, and each oscillates about the bearing 10 formed by the axle pivot 25. During this oscillatory movement, the wiper blade 17 is shifted parallel to the lower edge of the headlamp 20 until the arms commence the reverse movement. At this point, the wiper strip, as indicated at 17' in FIGS. 1 and 2, rests at the upper edge of the headlamp with the wiper arms assuming the position indicated in dotted lines at 11' and 12' in FIG. 1 and FIG. 2.

Figure 2:
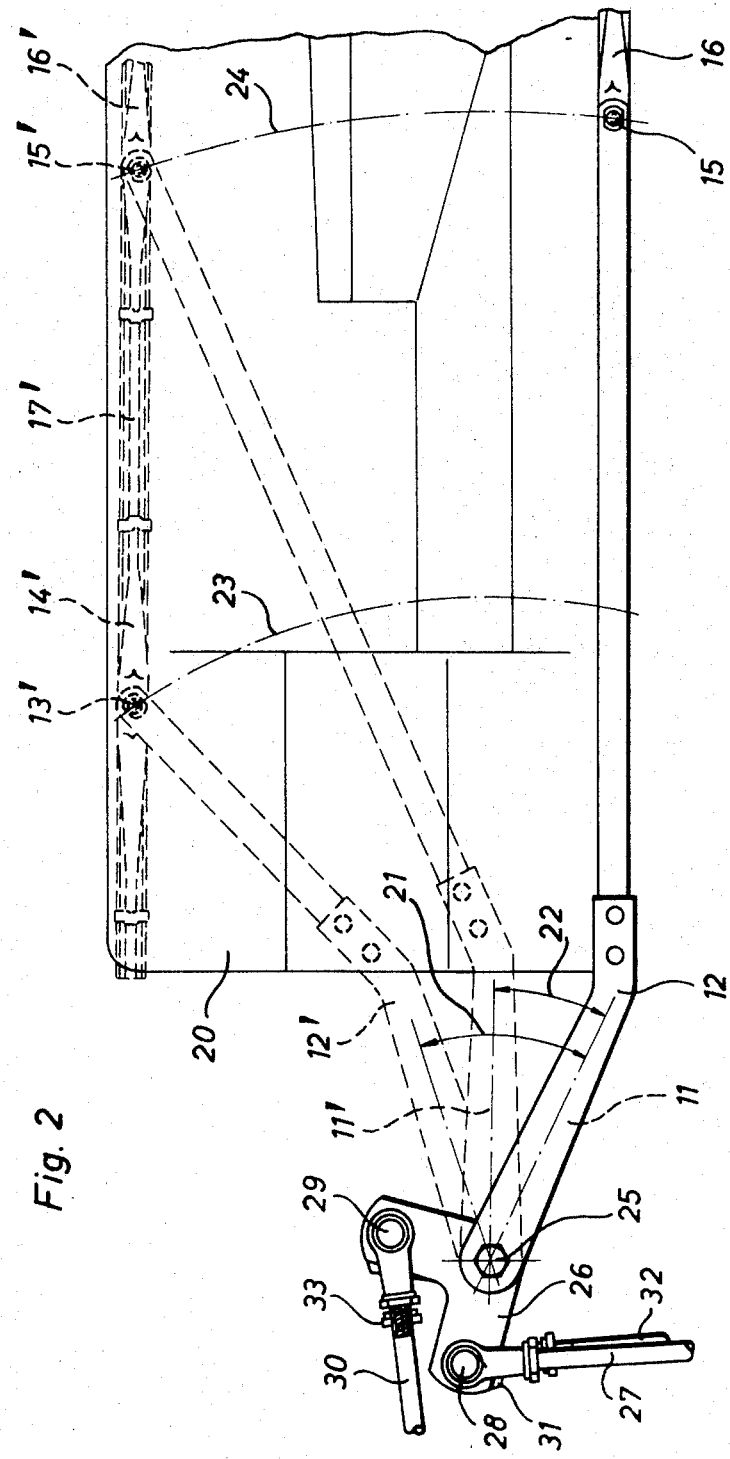
FIG. 2 is a front elevational view of a portion of a wiper blade mechanism for wiping a glass of a rectangular headlight constructed in accordance with the invention.

During the wiping operation, the pivot bearings 13 and 15 move along the arcuate path 23 and 24 shown in dot and dash lines in FIG. 2 and in solid lines in FIG. 1. The yoke 16 is mounted on the associated blade 17 so as to be non-displaceable so that the outer ends of the yoke 16 and the wiper strip 17 are guided over the circular paths 39 and 40 shown in FIG. 1. The inner end of the wiper blade 17 moves over the circular path 37 shown in FIG. 1, which is determined by the rigid coupling of the strip with the yoke 16. In order to permit the yoke 14 on the wiper arm 12 to describe the circular path 23, this yoke 14 is mounted so as to be displaceable along the wiper strip 17. As shown in FIG. 2, the wiper arm 12 overlies the wiper arm 11 in the parking position.

The individual arms 11 and 12 are connected to carry out the separate partial movements by driving cranks formed as bell crank levers 26 and 31, respectively. The wiping angles 21 and 22 are determined by the adjustment of the associated push rods 27 and 32 which are connected to crank levers 26 and 31, respectively. The push rods are pivotally mounted on hinge pins of the respective bell crank levers 26 and 31, for example, hinge pin 28 is mounted on the angle lever 26 and connected to the push rod 27. By rotation of the bell crank levers 26 and 31 in a counterclockwise direction, the wiper arms 11 and 12 are moved into the top positions or reversing positions 11' and 12'. The rotation in an opposite, clockwise, direction causes the wiper arms to be returned into the parking position shown in solid lines in FIG. 2. During the wiping operation, therefore, the wiper blades remain level or parallel to the top and bottom edges of the headlamp glass 20.

Figure 3:
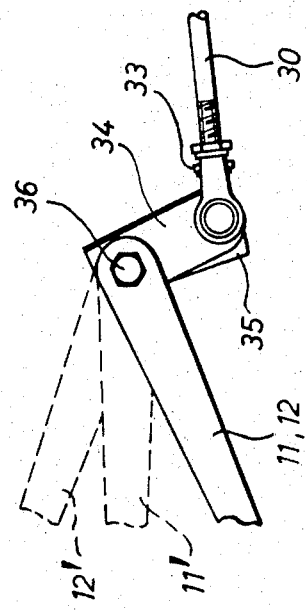
FIG. 3 is an enlarged partial elevational view of the operating mechanism for a double wiper bearing.

The levers 26 and 34 may be connected by hinge pin 29 on a lever 26 and a comparable hinge pin on the lever 31 to actuate two further rods 30 and 33 connected to a further double wiper mounting 36, as shown in FIG. 3, for the other headlamp of the vehicle. The driving cranks 34 and 35 are oscillated so that the wiper arms 11 and 12 of this other headlamp mechanism (not shown) are moved in the same manner as described in respect to the arrangement of FIGS. 1 and 2. The wiper bearing 36, as shown in FIG. 3, provides the pivot for the respective arms 11 and 12 of this operating mechanism. The mechanism shown provides a movement of the wiper arms of the other side for the other headlight in a direction opposite to that of the illustrated headlight but it is obvious that this can be converted to movement in the same direction if desired. For this purpose, it will be only necessary to mount the driving cranks 34 and 35 so that they are turned through 180°.

When a drive is provided for both wiper arms on the two headlamps, it is advisable to arrange the wiper bearings 25 and 36 in the region of the adjacent sides of the headlamps.

When the headlamp glasses 20 are curved across their width, the supporting yokes 14 and 16 are fastened to the wiper arms 11 and 12 in a manner such that they are tiltable at right angles to the wiping strip 17. This then ensures that the wiper blade 17 conforms to the curvature of the glass because of its flexibility.

While a specific embodiment of the invention has been shown and described in detail to illustrate the application of the principles of the invention, it will be understood that the invention may be embodied otherwise without departing from such principles.

What is claimed is:

1. A windshield wiper assembly for wiping a rectangular wiping area, particularly for wiping a rectangular headlamp glass, comprising a wiper blade, a plurality of wiper arms of different lengths having inner ends pivotally mounted for oscillation about the same oscillation axis and opposite outer ends, a yoke pivoted to each arm adjacent the outer ends thereof and connected to said wiper blade at respective spaced longitudinal locations therealong, and drive means separately connected to each of said arms to oscillate said arms through separate angles of oscillation in a manner to cause said wiper blade to move from one side to the other of said wiping area while it is maintained substantially parallel to each side.

2. A windshield wiper assembly, according to claim 1, wherein there are two wiper arms, the longer one of which overlies the shorter one in a park position of the windshield wipers in which the blade is located along one side of the wiping area.

3. A windshield wiper assembly, according to claim 1, wherein said yokes are pivoted to each arm about pivots which are aligned in the wiping area plane and which extend at substantially right angles to the wiper arm.

4. A windshield wiper assembly, according to claim 1, wherein said yokes of individual arms engage said blade at spaced longitudinal locations, said blade being of a length comparable to the length of the wiping area, said wiper arms comprising angle members, said oscillation axis being located beyond one end of the wiping area.

5. A windshield wiper assembly, according to claim 4, wherein said wiper blade is supported on the bottom of the wiping area in the parking position.

6. A windshield wiper assembly, according to claim 1, wherein one of said yokes is axially non-displaceably connected to said wiper blade while the other of said yokes are axially displaceable therealong.

7. A windshield wiper assembly, according to claim 1, wherein an additional rectangular wiping area is spaced laterally from the first wiping area, and including a second plurality of wiper arms of different lengths having inner ends pivotally mounted for oscillation about a second same oscillation axis and having opposite outer arms, a second wiper blade for wiping said second wiping area, second yokes pivoted to each arm adjacent the outer ends thereof and connected to said second wiper blade at respective spaced longitudinal locations therealong, said drive means including means connected to said second wiper arms to oscillate said second wiper arms through separate angles of oscillation to cause said second wiper blades to move from one side to the other of the second wiping area.

8. A windshield wiper assembly, according to claim 7, wherein said drive means are located between said two wiping areas and includes a common drive for said wiper arms and said second wiper arms.

* * * * *